United States Patent
Smith et al.

(10) Patent No.: US 8,130,121 B2
(45) Date of Patent: Mar. 6, 2012

(54) AUTOMATED TURBULENCE DISPLAY SYSTEM

(75) Inventors: Robert P. Smith, Clinton, WA (US); David E. Stulken, Mercer Island, WA (US); Peter J. Batsakes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 895 days.

(21) Appl. No.: 12/194,974

(22) Filed: Aug. 20, 2008

(65) Prior Publication Data

US 2010/0315265 A1  Dec. 16, 2010

(51) Int. Cl.
*G08B 23/00* (2006.01)
*G08B 21/00* (2006.01)

(52) U.S. Cl. ........ 340/945; 340/963; 340/971; 340/974; 340/976; 701/200; 701/201; 701/202

(58) Field of Classification Search .................. 340/963, 340/945, 971, 974, 976; 701/3, 4, 200–210
See application file for complete search history.

(56) References Cited

U.S. PATENT DOCUMENTS

| | | | |
|---|---|---|---|
| 5,541,591 A | 7/1996 | Bush | |
| 6,381,538 B1 | 4/2002 | Robinson et al. | |
| 6,650,972 B1 | 11/2003 | Robinson et al. | |
| 6,744,382 B1 * | 6/2004 | Lapis et al. | 340/971 |
| 6,917,860 B1 | 7/2005 | Robinson et al. | |
| 7,400,293 B2 | 7/2008 | Fleming | |
| 7,656,343 B1 * | 2/2010 | Hagen et al. | 342/26 B |
| 2002/0039072 A1 * | 4/2002 | Gremmert et al. | 340/945 |
| 2006/0129286 A1 * | 6/2006 | King | 701/4 |
| 2007/0203620 A1 | 8/2007 | Gremmert | |
| 2007/0208465 A1 | 9/2007 | Gremmert | |
| 2008/0035784 A1 | 2/2008 | Meserole et al. | |

OTHER PUBLICATIONS

Robinson, "The development and evaluation of a real-time Turbulence Auto-PIREP System for aircraft", Digital Avionics Systems Conference, 2003, vol. 2, pp. 2.A2-9.1-8.
"Web Aircraft Situation Display (WebASD)", 2008, ARINC Incorporated, retrieved Aug. 12, 2008, 1 page http://www.arinc.com/products/voice_data_comm/webasd.html.
Robinson, "Advances in Turbulence Detection and Avoidance for Commercial", 59th Annual International Air Safety Seminar, Paris France, Oct. 2006, pp. 1-20.
"Turbulence Auto-PIREP System (TAPS), an Overview", ATR-2005-17WP11, 2005 Aero Tech Research (U.S.A.) Inc., pp. 1-8.

* cited by examiner

*Primary Examiner* — George Bugg
*Assistant Examiner* — Sisay Yacob
(74) *Attorney, Agent, or Firm* — Yee & Associates, P.C.

(57) ABSTRACT

A method identifies turbulence information from turbulence data generated by a set of remote aircraft based on a request to form identified turbulence information. The turbulence information is identified in response to the request received at an aircraft to view the turbulence information. The identified turbulence information is displayed on a display device in the aircraft.

25 Claims, 13 Drawing Sheets

AUTOMATED TURBULENCE DISPLAY SYSTEM

BACKGROUND INFORMATION

1. Field

The present disclosure relates generally to an improved aircraft data processing system and in particular to a method and apparatus for processing and displaying turbulence information. Still in particularly, the present disclosure relates to a computer implemented method, apparatus, and computer program product for presenting turbulence information.

2. Background

Atmospheric stability may vary in the air at altitudes used by an aircraft. When an aircraft flies in unstable air, the aircraft may encounter turbulence, and the aircraft may move erratically. The erratic movement of the aircraft may cause shifting of items, passengers, and crew members that may be unsecured within the aircraft. As a result, discomfort and/or injury for passengers and flight crew members may result.

Pilots will avoid turbulent areas when possible to avoid passenger and/or crew member discomfort or injury. Pilots rely on many sources of information to avoid turbulence. These sources of information include, for example, weather forecasts and pilot reports (PIREPs). A pilot report is a single report of actual weather conditions encountered by an aircraft in flight. This type of information is transmitted by a pilot through voice or data link means to a ground station. This information may then be collected, stored, and then communicated by various air traffic control services, weather providers, or flight dispatch departments to other aircraft in flight.

When a pilot in an aircraft receives a pilot report of turbulence, the pilot may then determine whether the aircraft might encounter the reported turbulence. Further, with this information, the pilot can take action to mitigate or avoid the turbulence. The pilot may secure the passengers and flight attendants in the passenger cabin, or change altitude or route in an effort to avoid the turbulence.

SUMMARY

In one advantageous embodiment, a method identifies turbulence information from turbulence data generated by a set of remote aircraft. The turbulence information is identified in response to a request at an aircraft to view the turbulence information. The identified turbulence information is displayed on a display device in the aircraft.

In another advantageous embodiment, a data processing system for presenting turbulence information is present. The data processing system comprises a bus; a communications unit connected to the bus; a storage device connected to the bus, wherein the storage device includes program code; and a processor unit connected to the bus. The processor unit executes the program code to identify turbulence information from turbulence data generated by a set of remote aircraft based on the request to form identified turbulence information in response to a request received at the aircraft to view turbulence information. The processor unit executes the program code to display the identified turbulence information on a display device in the aircraft.

In yet another advantageous embodiment, a computer program product is present for presenting turbulence information. The computer program product comprises a computer recordable storage medium, and program code stored on the computer recordable storage medium. Program code is present for identifying the turbulence information from turbulence data generated by a set of remote aircraft based on a request to form identified turbulence information in response to the request received at an aircraft to view the turbulence information. Program code is present for displaying the identified turbulence information on a display device in the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
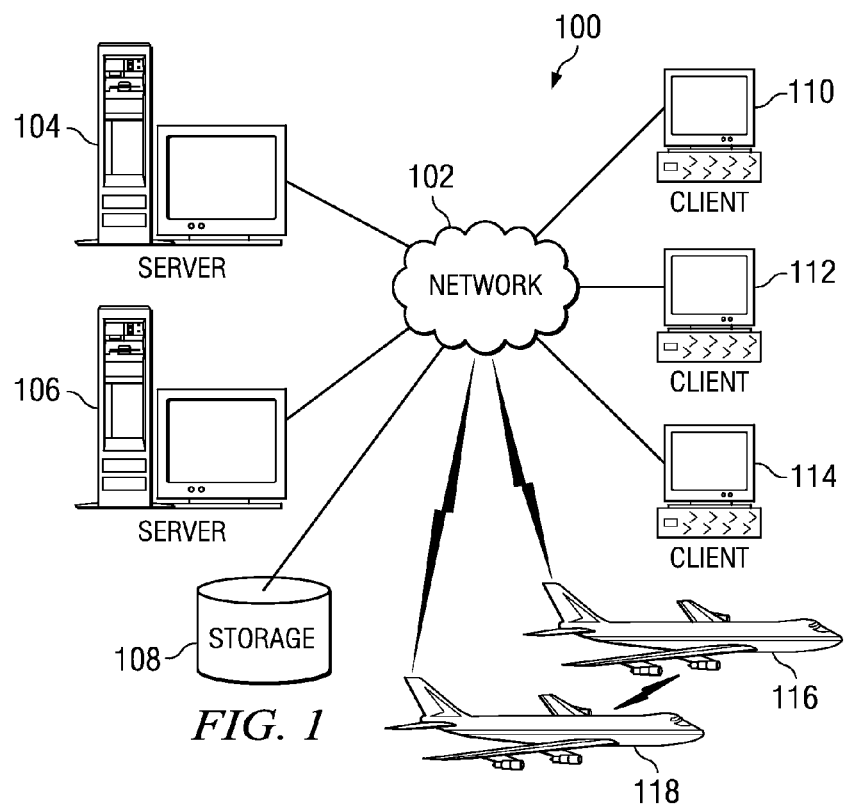
FIG. 1 depicts a pictorial representation of a network of data processing systems in which the advantageous embodiments of the present invention may be implemented.
Figure 2:
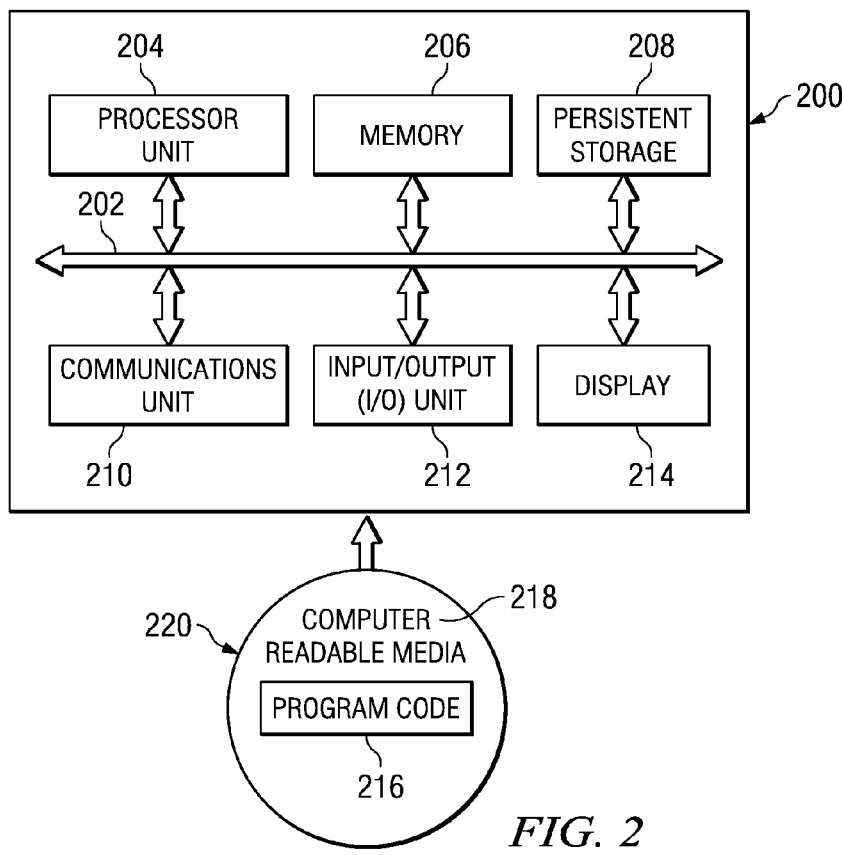
FIG. 2 is a diagram of a data processing system in accordance with an illustrative embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 and aircraft 118 also are clients that may exchange information with each other and with clients 110, 112, and 114. Aircraft 116 and aircraft 118 also may exchange information with servers 104 and 106.

Aircraft 116 may exchange data with different computers through a wireless communications link while in-flight or any other type of communications link while on the ground. Further, aircraft 116 and aircraft 118 may receive data about turbulence. The different advantageous embodiments provide information and advisories and present this information to the pilot and crew in aircraft 116 and aircraft 118.

In these examples, server 104, server 106, client 110, client 112, and client 114 may be computers. Network data processing system 100 may include additional servers, clients, and other devices not shown. In these examples, aircraft 116 and aircraft 118 generate and send data about turbulence during flight.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as any of a number of different types of networks, such as, for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. Data processing system 200 is an example of a data processing system that may be used to implement servers and clients, such as server 104 and client 110. Further, data processing system 200 is an example of a data processing system that may be found in an aircraft such as, for example, aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either one of or both physical and wireless communications links.

Input/output (I/O) unit 212 allows for input and output of data through and to other devices that may be connected to data processing system 200. For example, input/output (I/O) unit 212 may provide a connection for operator input through a keyboard and mouse. Further, input/output (I/O) unit 212 may send output to a printer. Display 214 provides a mechanism to display information to an operator.

Instructions for the operating system and applications or programs are located on persistent storage 208. These instructions may be loaded into memory 206 for execution by processor unit 204. The processes of the different embodiments may be performed by processor unit 204 using the computer implemented instructions, which may be located in memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded into or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output (I/O) unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system that includes components in addition to or in place of those illustrated for data processing system 200. Other components shown in FIG. 2 can also be varied from the illustrative examples shown.

In order to implement communications fabric 202, one or more buses comprising a bus system, such as, for example, a system bus or an input/output bus, may be used. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments provide a computer implemented method, apparatus, and computer program code for presenting turbulence information. In the different advantageous embodiments, aircraft 118 may automatically generate reports in response to detecting turbulence. These reports may be sent to the data processing system on the ground, such as, for example, server 104.

Server 104 may send reports received from aircraft 118 and other aircraft to aircraft 116. The reports received by aircraft 116 may then be processed and displayed to a pilot. Further, in other advantageous embodiments, reports generated by aircraft 118 may be sent directly to aircraft 116.

In different advantageous embodiments, these reports may take any format and may be used to transmit data about turbulence in these examples. The different reports generated by aircraft also may include reports that indicate no turbulence has been encountered.

The different advantageous embodiments provide a method, apparatus, and computer program code for presenting turbulence information. In response to a request to view turbulence information in an aircraft, turbulence information is identified from turbulence data that has been generated by a set of remote aircraft. The identified turbulence information may then be displayed on a display device in the aircraft.

In these examples, turbulence data is data about the presence or absence of turbulence. Turbulence data also may include other related information, such as a location of the aircraft, a time, a temperature, winds, or other suitable information. Turbulence information is information that is presented to an operator based on turbulence data. Turbulence information may be, for example, a graphical indicator, such as an icon identifying a report. Further, the turbulence information may include a placement of the icon in the location of a map.

In the different advantageous embodiments, this display may be presented with reference to a map or other aeronautical chart. The different locations at which reports have been generated can be color coded to identify a level of turbulence. The request generated to view turbulence data may provide a pilot with a capability to control the display of the turbulence information using various parameters. For example, turbulence information may be selected based on the age of the information, the reported intensity level of turbulence, altitude of the turbulence, location of the turbulence, and/or other suitable parameters.

Figure 3:
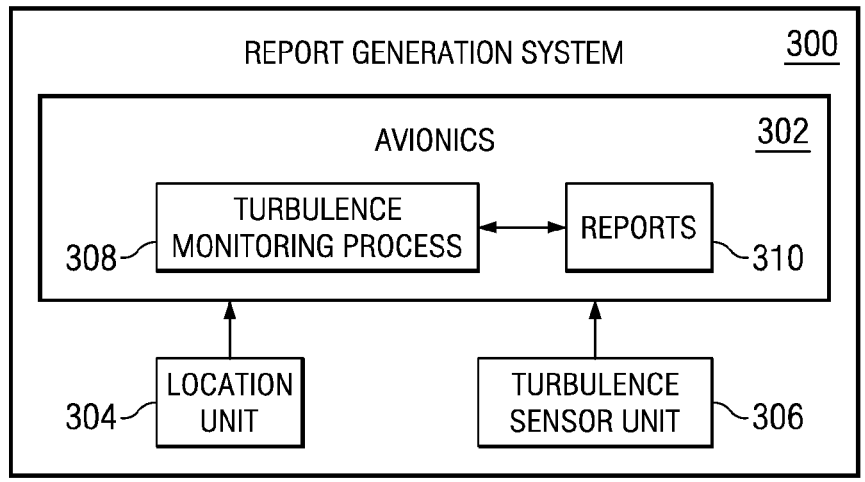
FIG. 3 is a diagram of a report generation system in accordance with an advantageous embodiment.

With reference now to FIG. 3, a diagram of a report generation system is depicted in accordance with an advantageous embodiment. In this example, report generation system 300 is an example of a system that may be implemented in an aircraft, such as, for example, aircraft 116 in FIG. 1. Report generation system 300 includes avionics 302, location unit 304, and turbulence sensor unit 306.

Avionics 302 is a system within the aircraft that includes communication systems, navigation systems, monitoring systems, flight control systems, collision avoidance systems, weather systems, and other suitable systems. Avionics 302 may include one or more data processing systems, such as, for example, data processing system 200 in FIG. 2.

Location unit 304 includes one or more devices that generate location information. This location information contains a location of the aircraft at a particular point in time. This location includes an identification of the location of the aircraft in three dimensions, such as longitude, latitude, and altitude. Further, in some advantageous embodiments, location unit 304 also may identify a velocity and/or heading of the aircraft. Location unit 304 may be implemented using various devices. For example, location unit 304 may be implemented using a global positioning system, an inertial guidance system, and/or some other suitable device.

Turbulence sensor unit 306 is a set of sensors capable of detecting turbulence encountered by an aircraft in which turbulence sensor unit 306 is located. A set as used herein refers to one or more items. For example, a set of sensors is one or more sensors. A sensor used within turbulence sensor unit 306 may include, for example, without limitation, a vertical accelerometer, a longitudinal accelerometer, a toroidal accelerometer, a vibration sensor, or any other suitable device.

In these examples, turbulence monitoring process 308 executes within avionics 302 in report generation system 300. Turbulence monitoring process 306 monitors turbulence sensor unit 306 for any turbulence that may be encountered. Turbulence monitoring process 308 generates reports 310 based on data received from turbulence sensor unit 306 and location unit 304. Each report in reports 310 contains turbulence data. Turbulence data is information about conditions present when a report is generated. This turbulence data may include, for example, without limitation, data on the level of turbulence, a location of the aircraft, weight and speed of the aircraft, wind speeds at the location of the aircraft, temperature, and other suitable information. In these examples, turbulence monitoring process 308 may generate a report on a periodic basis.

The frequency at which a report in reports 310 may be generated may vary. For example, the period may be thirty seconds, one minute, five minutes, or some other suitable period of time. Further, turbulence monitoring process 308 also may generate a report in a non-periodic fashion. For example, turbulence monitoring process 308 may generate a report in reports 310 if turbulence is detected by turbulence sensor unit 306.

In these advantageous embodiments, turbulence monitoring process 308 automatically generates turbulence data in the form of reports 310 without a pilot or other crew member initiating the generation of the report.

In these different advantageous embodiments, reports 310 also include reports of when no turbulence has been encountered or detected by turbulence sensor unit 306. Turbulence monitoring process 308 may transmit reports 310 to a ground station or another aircraft for processing. Reports 310 may be transmitted as the reports are generated or on a periodic basis.

The illustration of report generation system 300 in FIG. 3 is not meant to imply physical or architectural limitations on a manner in which the report generation system may be implemented. For example, in other advantageous embodiments, turbulence monitoring process 308 may be executed on a data processing system that is separate from the typical avionics found in an aircraft.

As another example, all of turbulence monitoring process 308 is shown as a single process. In other advantageous embodiments, multiple functions or processes may be used to implement monitoring for turbulence, generating reports, and transmitting reports.

Figure 4:
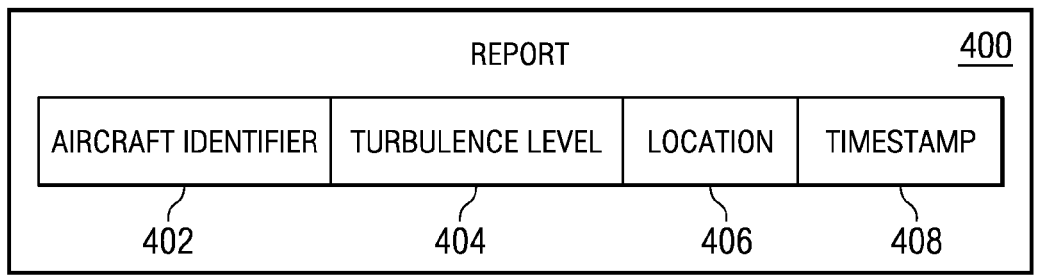
FIG. 4 is an illustration of a report in accordance with an advantageous embodiment.

With reference now to FIG. 4, an illustration of a report is depicted in accordance with an advantageous embodiment. In this example, report 400 is an example of a report found in reports 310 in FIG. 3. Report 400 is an example of a format for turbulence data that may be generated by turbulence monitoring process 308 in FIG. 3. In these examples, report 400 includes aircraft identifier 402, turbulence level 404, location 406, and timestamp 408. Aircraft identifier 402 identifies the aircraft generating the report 400. Identifier 402 may identify the type of aircraft and/or uniquely identify the aircraft itself. Turbulence level 404 identifies a level of turbulence.

The level of turbulence in turbulence level 404 may be identified in various forms. For example, without limitation, the turbulence level may be no turbulence, light turbulence, moderate turbulence, or extreme turbulence. Of course, other types of descriptors or mechanisms may be used.

As another example, turbulence level 404 may be a numerical value indicating the intensity of the turbulence. For example, turbulence level 404 may contain actual measurements such as eddy dissipation rates. Other measurements may be in root mean square g (RMSg) or any other suitable measurement system or units. In other advantageous embodiments, turbulence level 404 may include measurements of the atmospheric turbulence effect on an aircraft. Of course, a combination of this type of measurement or other types of turbulence measurements also may be used in turbulence level 404.

Location 406 identifies a location at which the turbulence data in report 400 is generated. This location is in three dimensions. Timestamp 408 identifies a time at which the report 400 is generated. Timestamp 408 also may include a date.

Of course, the illustration of the different types of data within report 400 is presented for purposes of depicting one manner in which a report may be generated. In other advantageous embodiments, other types of information may be included in addition to or in place of the information illustrated in this example. In other advantageous embodiments, other information such as, for example, wind and temperature also may be included.

Figure 5:
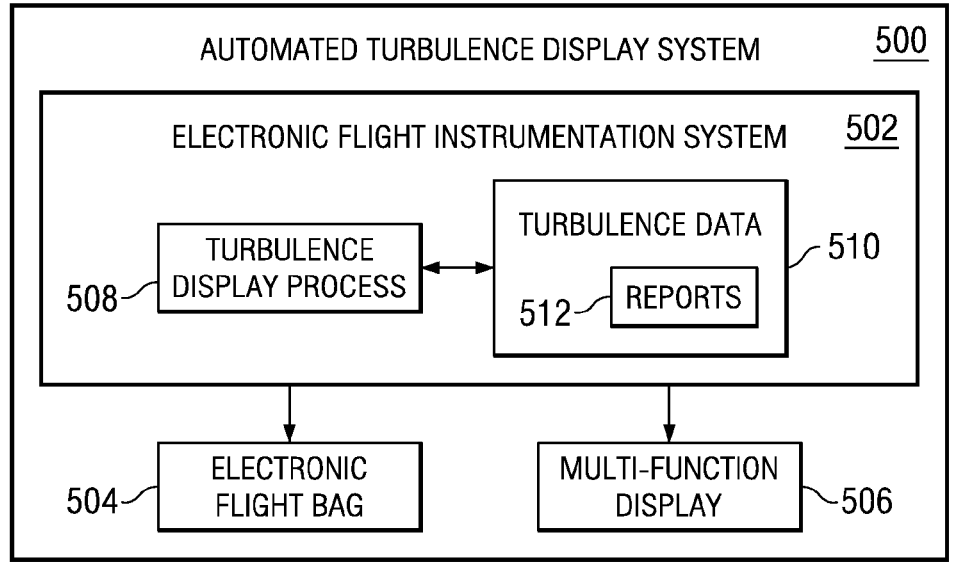
FIG. 5 is an illustration of an automatic turbulence display system in accordance with an advantageous embodiment.

With reference now to FIG. 5, an illustration of a turbulence display system is depicted in accordance with an advantageous embodiment. In this example, turbulence display system 500 is an example of a system that may be found in an aircraft, such as, for example, aircraft 116 in FIG. 1.

In this example, turbulence display system 500 may be implemented using electronic flight instrumentation system 502 in an aircraft. Electronic flight instrumentation system 502 may be implemented using a data processing system such as, for example, data processing system 200 in FIG. 2. The electronic flight instrumentation system 502 is a flight deck instrument display system that may be used to present information about the aircraft as well as other information related to the flight of the aircraft.

In these examples, this information may be presented using electronic flight bag (EFB) 504 and/or multi-function display 506. Electronic flight bag 504 or multi-function display 506 may be used to display information, such as, for example, navigational information, weather information, and other information. Electronic flight bag 504 or multi-function display 506 may display a location of the aircraft on a map or chart to identify the current route planned for the aircraft as well as weather information.

In these different advantageous embodiments, turbulence display process 508 displays turbulence data 510 on electronic flight bag 504 or multi-function display 506. Further, an operator of the electronic flight instrumentation system 502 may interact with electronic flight bag 504 or multi-function display 506 to control or identify information within turbulence data 510 for display on electronic flight bag 504 or multi-function display 506. This information identified from turbulence data 510 is also referred to as turbulence information.

In these examples, turbulence data 510 contains reports 512. Reports 512 are reports of turbulence received from various sources. Report 400 in FIG. 4 is an example of a report within reports 512. Reports 512 may be received directly from other aircraft and/or ground systems.

In these examples, electronic flight bag 504 or multi-function display 506 may present graphical indicators in the form of icons to identify the location of each report in reports 512. Further, these icons may be color coded to identify a level of atmospheric turbulence that has been measured. The color coding may also indicate when no turbulence or an absence of turbulence has been measured. These icons may be presented on or as an overlay to a map or aeronautical chart.

Turbulence display process 508 provides an operator a capability to filter and/or select portions of reports 512 for presentation. For example, the selection of reports 512 may be based on the age of the reports, the reported level of turbulence, altitude, and/or other suitable parameters that may be selected by an operator. Also, turbulence display process 508 may automatically generate an advisory based on turbulence data 510.

For example, if a report in reports 512 is received for turbulence data 510 that indicates that turbulence has been detected within some period of flight time along a path or planned route for the aircraft, turbulence display process 508 may generate an advisory to the pilot and/or crew of the aircraft. With this advisory, an operator may then request a display of turbulence information for use in analyzing the situation and/or identifying whether any pilot actions are needed.

The illustration of automatic turbulence display system 500 in FIG. 5 is not meant to imply physical or architectural limitations on a manner in which different advantageous embodiments may be implemented. For example, in other advantageous embodiments, turbulence display process 508 may be executed in a separate data processing system from electronic flight instrumentation system 502.

Figure 6:
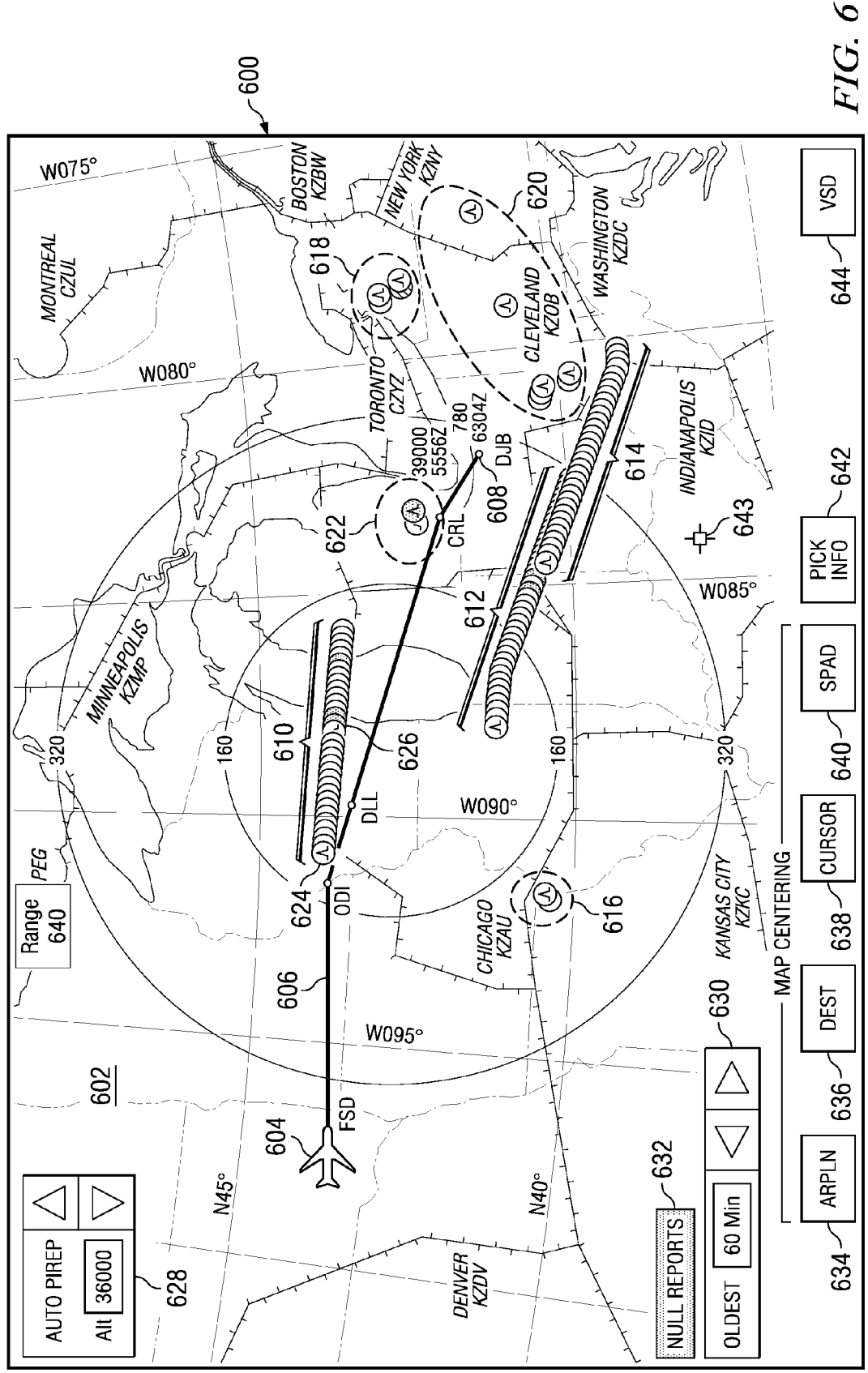
FIG. 6 is a diagram illustrating a display with turbulence reports in accordance with an advantageous embodiment.

With reference now to FIG. 6, a diagram illustrating a turbulence display is depicted in accordance with an advantageous embodiment. In this example, display 600 is an example of a display that may be presented on multi-function display 506 in FIG. 5.

In this example, display 600 includes map 602. Display 600 may be presented in multi-function display 506 in FIG. 5. In this illustrative example, map 602 is presented within display 600. Aircraft icon 604 represents a position and heading or track of an aircraft relative to the various features displayed in map 602. Further, route 606 also is presented in display 600 and identifies the active or modified route of the aircraft icon 604 to destination 608.

Display 600 may be a moving map display in which additional features are presented to automate the presentation of reports regarding turbulence. The icons in sections 610, 612, 614, 616, 618, and 620 are each a series of reports that have been generated by multiple aircraft. The icons in these different sections represent reports of turbulence. Each icon in each section represents a single report. Section 610 represents a series of reports generated periodically by an aircraft. Section 612 also represents a series of reports generated by another aircraft. In section 614, these reports also are generated periodically by yet another aircraft in this illustrative example.

In these depicted examples, each icon is color coded to indicate a type of turbulence that has been encountered. For example, icon 624 may have one color indicating no turbulence is present, while icon 626 may have another color indicating a specific level of turbulence.

In this illustrative example, the reports presented on display 600 are those at an altitude of around 36,000 feet that were generated within the past 60 minutes. The turbulence data presented on display 600 is filtered using a number of controls on display 600. For example, altitude control 628 provides an operator a capability to display reports on display 600 for different altitudes. As can be seen in this example, the altitude has been selected as around 36,000 feet. History control 630 provides an operator a capability to display reports of turbulence that have occurred within some past period of time. This period of time may be, for example, 10 minutes, 15 minutes, 20 minutes, 30 minutes, or some other suitable period of time. The reports displayed in this example have occurred within the last 60 minutes. Additionally, past reports are sorted based on time in these examples. The most current report icon is displayed above those reports for an earlier time.

NULL REPORTS button 632 is a control that allows an operator to display only reports in which turbulence of a specified threshold and above has been identified. The different advantageous embodiments recognize that reports identifying an absence of turbulence also may be helpful to pilots and the crew of an aircraft in addition to identifying where turbulence above a threshold is present.

ARPLN button 634 allows the operator to center the display of the information around the location of the aircraft as identified by aircraft icon 604. DEST button 636 is a control that allows an operator to center the display of information around the destination, such as, for example, destination 608. CURSOR button 638 allows an operator to center the presentation of display space around a cursor position, such as cursor 643. SPAD (scratch pad) button 640 allows an operator to center the display on a specific location entered into the control display unit (CDU) scratch pad.

PICK INFO button 632 is a control that allows an operator to display more information about a particular report in response to selecting the icon associated with the report. VSD button 644 allows an operator to see a vertical situation display in addition to a plan view map 602 on display 600.

Figure 7:
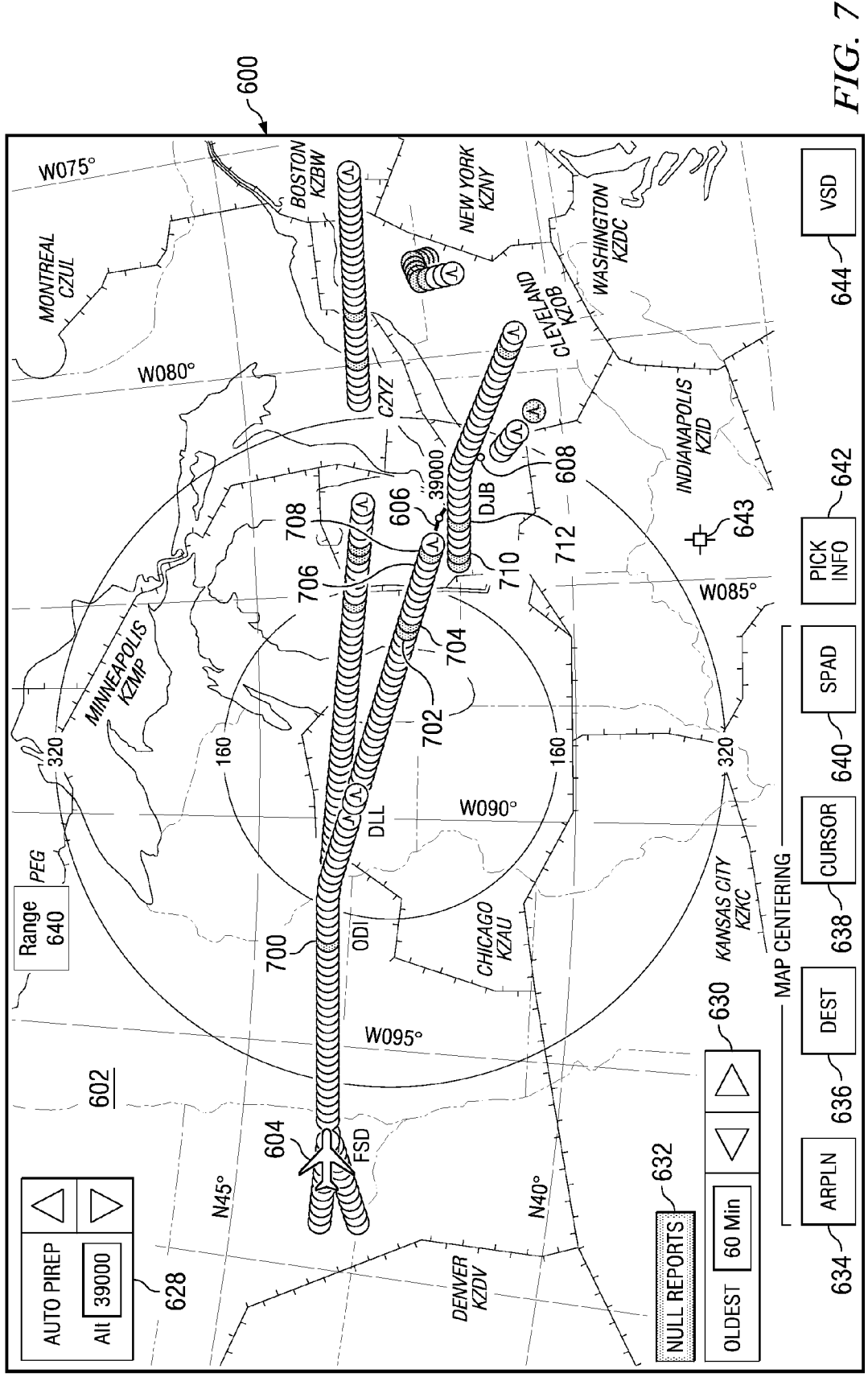
FIG. 7 is a diagram illustrating a display with turbulence reports in accordance with an advantageous embodiment.

With reference now to FIG. 7, an illustration of reports in a display is depicted in accordance with an advantageous embodiment. In this example, display 600 presents icons for reports that have been generated in the past 60 minutes around an altitude of 39,000 feet. In this example, the reports presented are all reports in which both a presence and an absence of turbulence has been detected. In this illustrative example, icons 700, 702, 704, 706, 708, 710 and 712 are icons indicating that turbulence has been detected along or near route 606. The other icons along or near route 606 indicate reports of an absence of turbulence.

In this depicted example, all reports are presented on display 600. As a result, a pilot may be able to identify areas or locations in which no turbulence has been detected as well as locations in which turbulence has been detected. The identification of locations in which no turbulence is present may aid the pilot in planning a flight.

Figure 8:
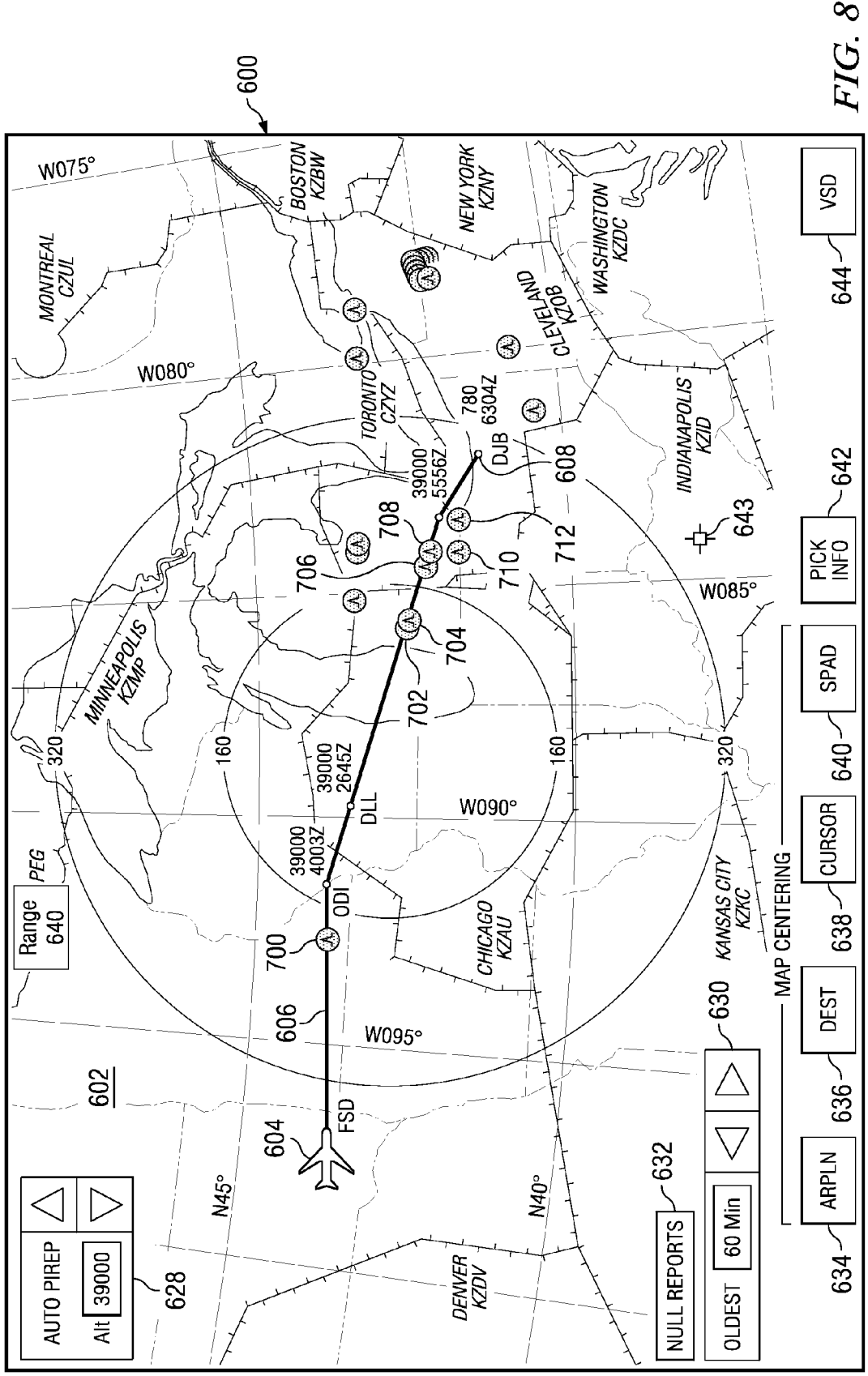
FIG. 8 is a diagram illustrating a display with turbulence reports in accordance with an advantageous embodiment.

With reference now to FIG. 8, a diagram illustrating a presentation of reports of turbulence in a display is depicted in accordance with an advantageous embodiment. In this example, display 600 presents only reports in which turbulence has been identified. As can be seen in this example, reports 700, 702, 704, 704, 708, 710, and 712 identify reports of turbulence that have occurred on or near route 606 in the past 60 minutes at 39,000 feet. This display is similar to the display in FIG. 7, except that reports of no turbulence or an absence of turbulence have been removed by the use of the NULL button 632.

Figure 9:
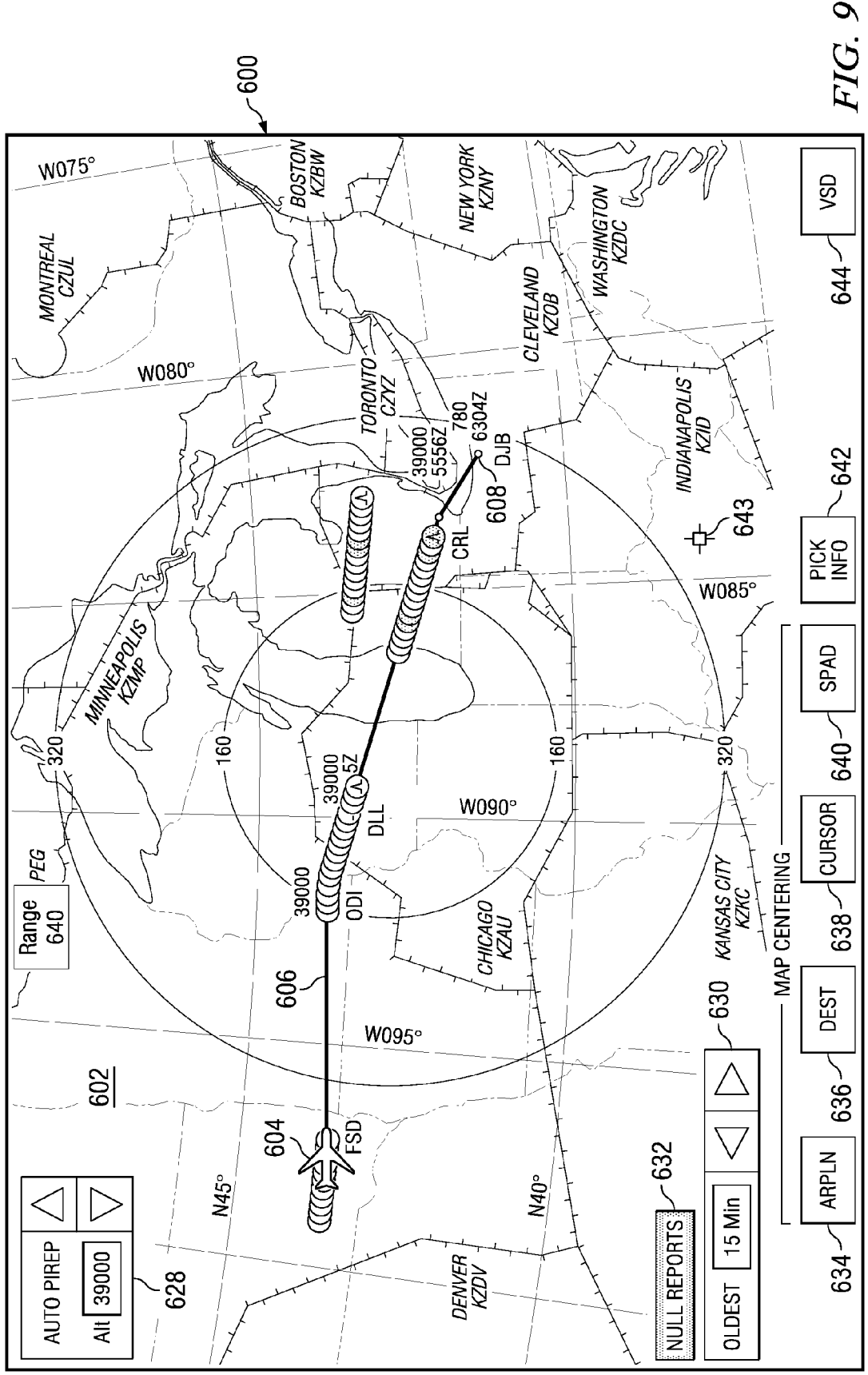
FIG. 9 is a diagram illustrating a display with turbulence reports in accordance with an advantageous embodiment.

With reference now to FIG. 9, a diagram illustrating the presentation of reports is depicted in accordance with an advantageous embodiment. In this example, the reports presented in display 600 are similar to those in FIG. 7. The icons identify reports generated around an altitude of 39,000 feet. History control 630 has been manipulated to only present reports that are no older than 15 minutes old.

Figure 10:
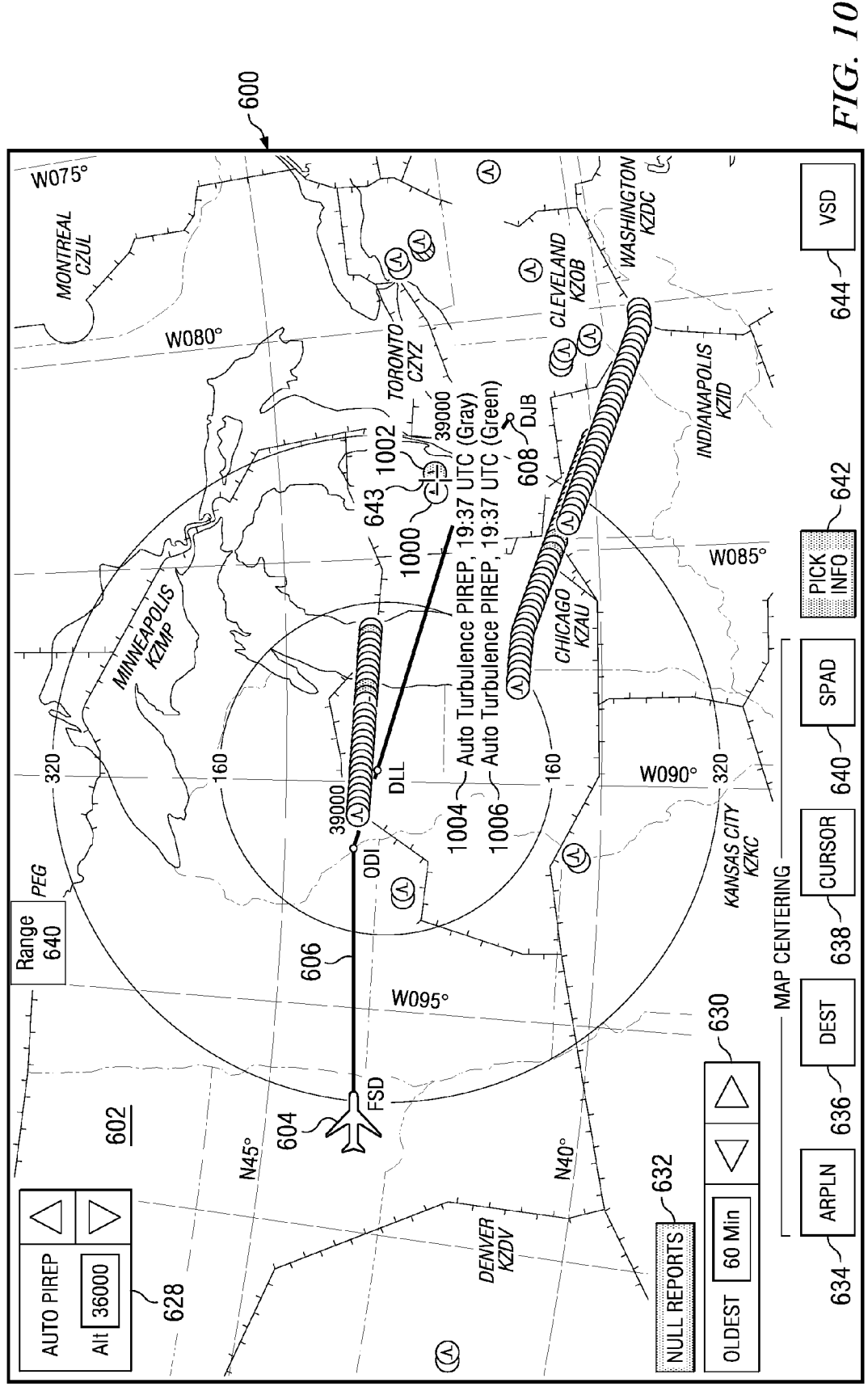
FIG. 10 is a diagram illustrating a display with turbulence reports in accordance with an advantageous embodiment.

With reference now to FIG. 10, a diagram illustrating a presentation of reports of turbulence is depicted in accordance with an advantageous embodiment. In this example, reports of turbulence that are around an altitude of 36,000 feet and that are not older than 60 minutes are presented in display 600. In this example, the pilot has selected the PICK INFO button 642 and cursor 643 has been moved over icons 1000 and 1002. This positioning of cursor 643 identifies text 1004 and 1006 describing reports that are available for viewing for icons 1000 and 1002. The operator may click the curser to select and obtain details of the report for a particular icon.

Figure 11:
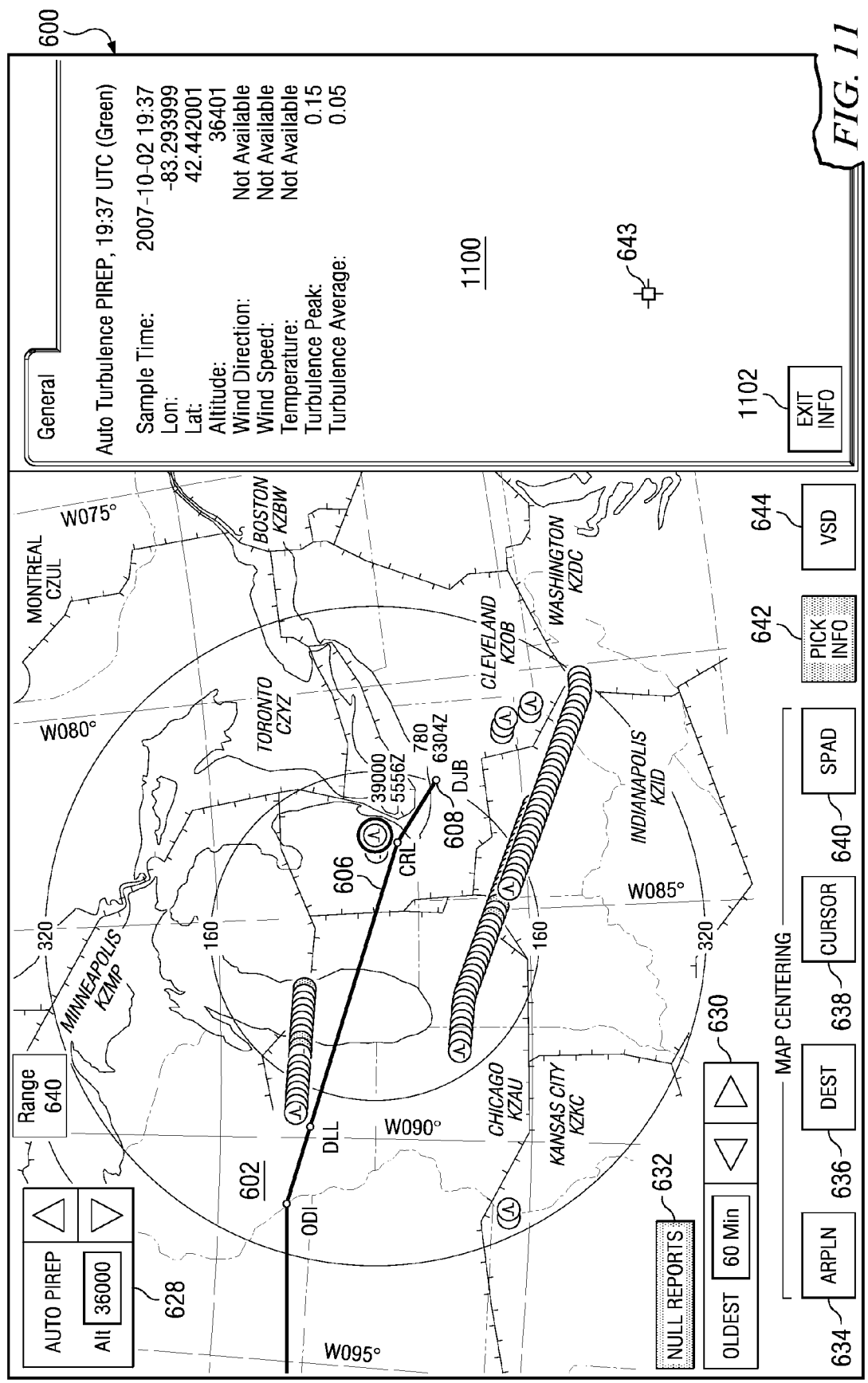
FIG. 11 is the diagram illustrating a display with turbulence reports in accordance with an advantageous embodiment.

Turning next to FIG. 11, the diagram illustrating the display of turbulence data is depicted in accordance with an advantageous embodiment. In this example, the operator has selected PICK INFO button 642 and icon 1002 in FIG. 10. The selection of icon 1002 results in report 1100 being presented on display 600.

In these examples, the selection of icon 1002 also results in icon 1002 being highlighted on the display. This highlighting may provide a visual confirmation of the selected icon and may help a pilot correlate data points between plan and vertical displays. The selected icon may be highlighted in the main display and/or the vertical situation display. Icon 1002 may remain highlighted until exit info button 1102 or another map item or turbulence icon is selected. Report 1100 provides more information about the turbulence that has been encountered. In this example, the turbulence data is measured as eddy dissipation rate. The operator may exit report 1100 by selecting EXIT INFO button 1102 in these examples.

Figure 12:
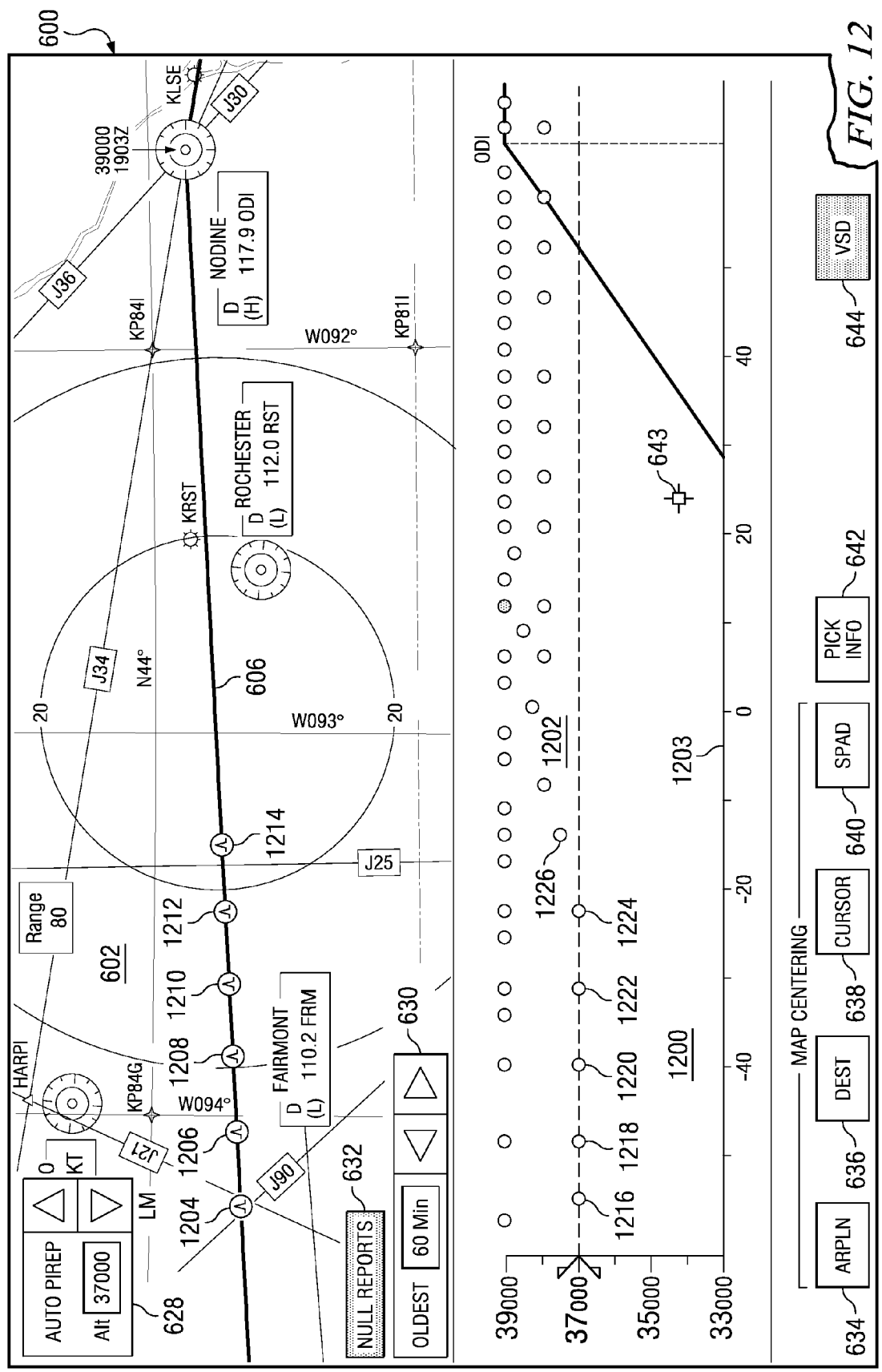
FIG. 12 is a display with turbulence reports using a vertical situation display in accordance with an advantageous embodiment.

With reference now to FIG. 12, a display of reports using a vertical situation display is depicted in accordance with an advantageous embodiment. In this example, an operator has selected VSD button 644 in display 600, resulting in the presentation of vertical situation display 1200. In this illustrative example, in addition to the information displayed on map 602, vertical situation display 1200 provides additional information to the operator.

Vertical situation display 1200 displays icons 1202 to identify reports along route 606. Axis 1203 in vertical situation display 1200 corresponds to route 606. Icons 1202 represent reports for different altitudes along route 606. In this example, the operator has selected to present reports on the vertical situation display 1200 for reports 1202 in the range of plus 2,000 to minus 4,000 feet from the selected altitude of 37,000 feet. As can be seen, on map 602, icons 1204, 1206, 1208, 1210, 1212, and 1214 are displayed along route 606 and correspond to the vertical situation display 1200 icons 1216, 1218, 1220, 1222, 1224, and 1226, for reports around 37,000 feet.

With vertical situation display 1200, the pilot also can see reports of turbulence for other altitudes along route 606 within a range of altitudes. In this example, the range of altitudes is from around 33,000 feet to 39,000 feet. Of course, other ranges may be used depending on the particular implementation.

Figure 13:
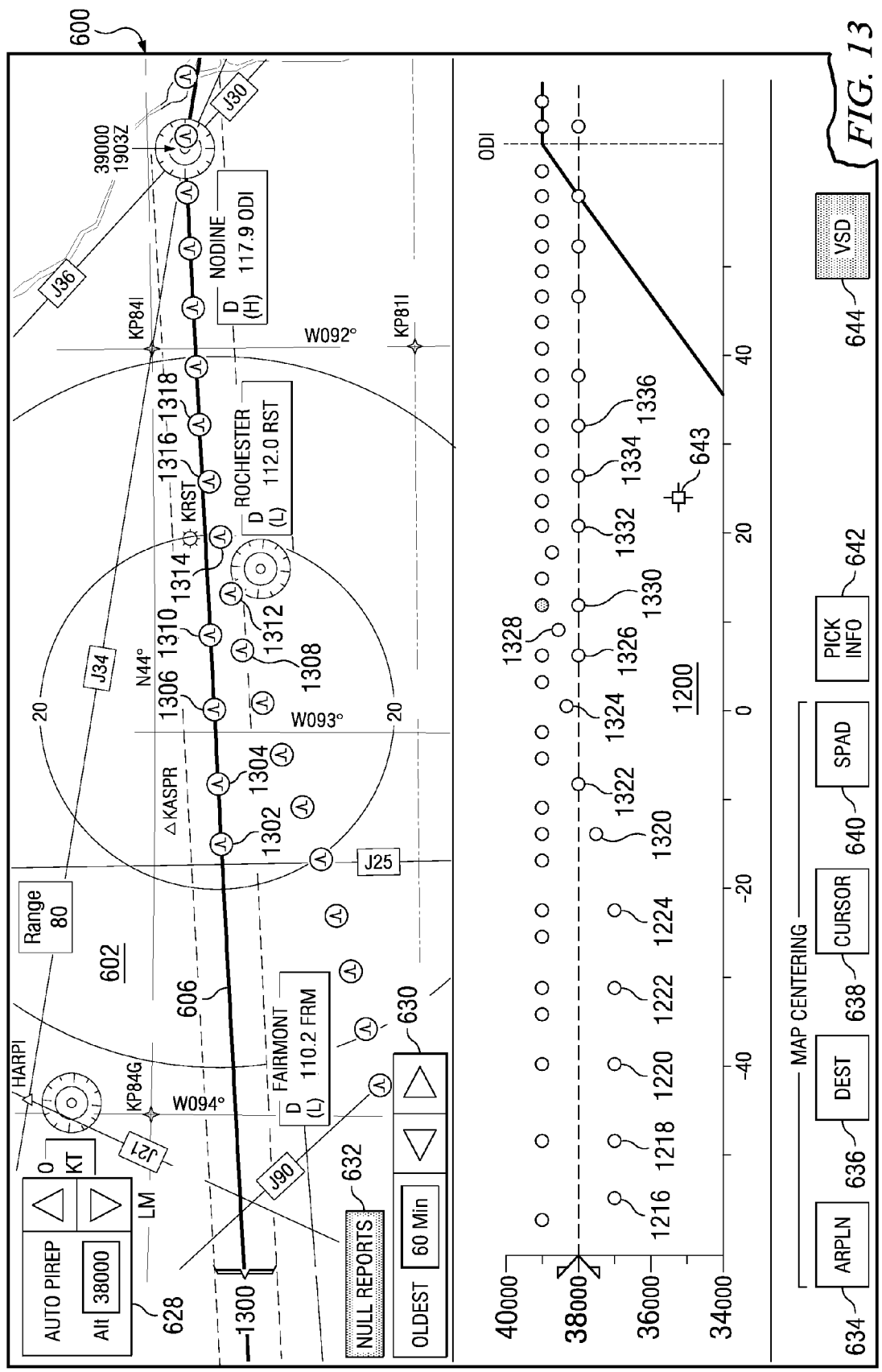
FIG. 13 is a diagram illustrating a display with turbulence reports in a vertical situation display in accordance with an advantageous embodiment.

With reference now to FIG. 13, a diagram illustrating a display of reports in a vertical situation display is depicted in accordance with an advantageous embodiment. In this example, the operator has selected reports around 38,000 feet in display 600. Vertical situation display 1200 allows the operator to see reports along route 606 at different altitudes, such as around 38,000 feet, around 37,000 feet, and around 39,000 feet within a specified lateral corridor, such as corridor 1300 along the route. All reports 1302, 1304, 1306, 1308, 1310, 1312, 1314, 1316, and 1318 within corridor 1300 as displayed along route 606 are also displayed on vertical situation display 1200 as reports 1320, 1322, 1324, 1326, 1328, 1330, 1332, 1334, and 1336, respectively.

Figure 14:
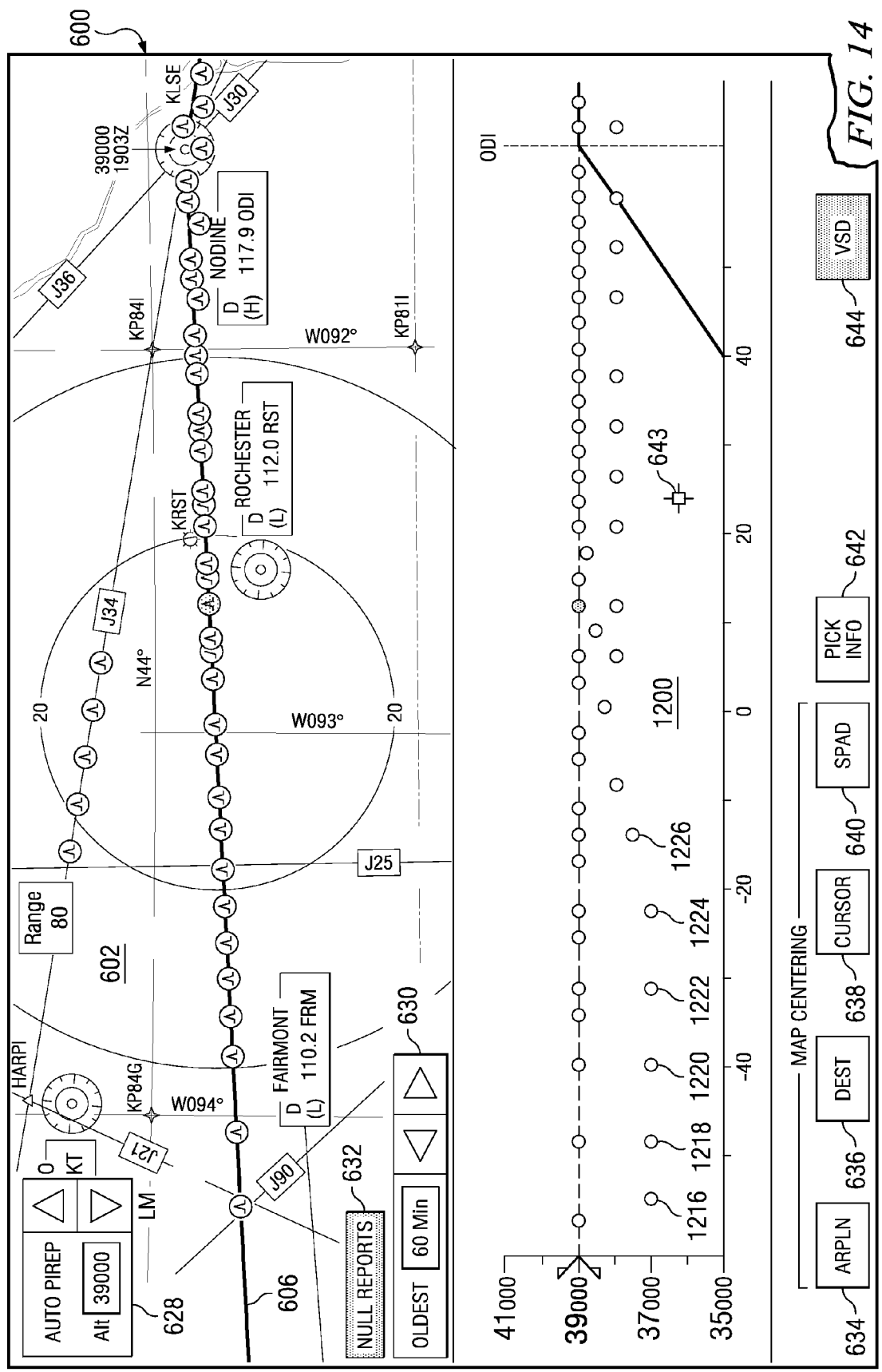
FIG. 14 is a diagram illustrating a display with turbulence reports in a vertical situation display in accordance with an advantageous embodiment.

With reference now to FIG. 14, another diagram illustrating a vertical situation display is depicted in accordance with an advantageous embodiment. In this example, the operator has selected an altitude around 39,000 feet using altitude control 628 in display 600. This selection results in a display of reports on map 602 that are present around the selected altitude. This display also includes a plan view display of all reports around the selected altitude, including reports that are not on or near route 606. Further, vertical situation display 1200 shows reports of turbulence at other altitude levels that are on or around route 606. These reports include reports 1216, 1218, 1220, 1224, and 1226.

The illustration of displays in FIGS. 6-14 are not meant to limit the manner in which other advantageous embodiments may be presented. In other advantageous embodiments, other types of icons may be used to indicate the presence of reports. Further, other controls may be present for manipulating and filtering turbulence data for presentation.

Figure 15:
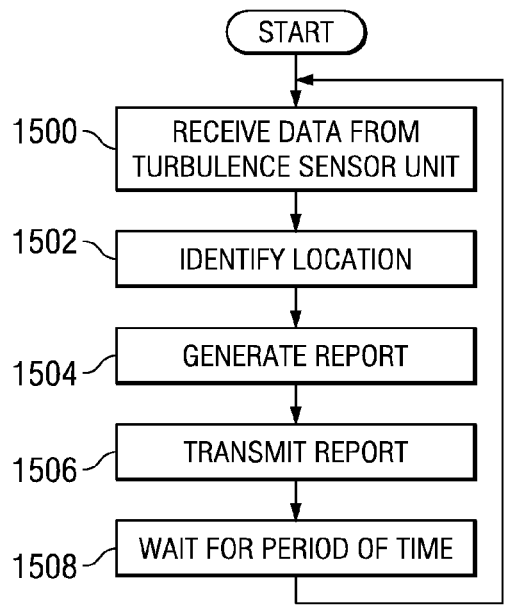
FIG. 15 is a flowchart of a process for generating reports of turbulence in accordance with an advantageous embodiment.

With reference now to FIG. 15, a flowchart of a process for generating reports of turbulence is depicted in accordance with an advantageous embodiment. The process illustrated in FIG. 15 may be implemented in a software component, such as, for example, turbulence monitoring process 308 in FIG. 3.

The process begins by the receiving of data from a turbulence sensor unit (operation 1500). This data may indicate an amount of turbulence or that no turbulence is present. The process then identifies a location of the aircraft (operation 1502).

Next, a report is generated (operation 1504). This report may include information such as that found in report 400 in FIG. 4. The process may then transmit the report (operation 1506). The process then waits for a period of time (operation 1508), after which the process then returning to operation 1500. In other advantageous embodiments, the report may be stored along with other reports until a batch of reports is transmitted on some periodic basis.

Figure 16:
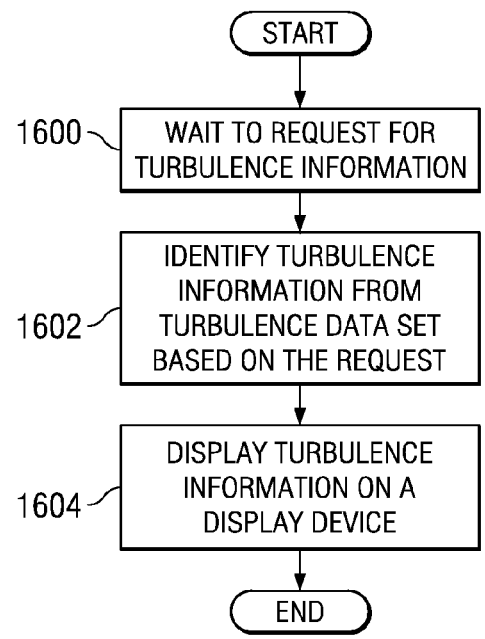
FIG. 16 is the high level flowchart of a process for presenting turbulence information in accordance with an advantageous embodiment.

With reference now to FIG. 16, the high level flowchart of a process for presenting turbulence information is depicted in accordance with an advantageous embodiment. The process illustrated in FIG. 16 may be implemented in a software component, such as, for example, turbulence display process 508 in FIG. 5.

The process waits to receive the request for turbulence information (operation 1600). When a request is received, turbulence information is identified from turbulence data based on the request (operation 1602). In operation 1600, this request may be a result of an operator input to a display, such as display 600 in FIG. 6. A request may be for turbulence information based on various parameters. These parameters may include, for example, an altitude, a location, an age of the reports, or some other suitable parameter.

The process then displays the turbulence information on a display device (operation 1604), with the process terminating thereafter. In these examples, the turbulence information may be presented using icons displayed on a map. This display may be similar to display 600 in FIG. 6.

Figure 17:
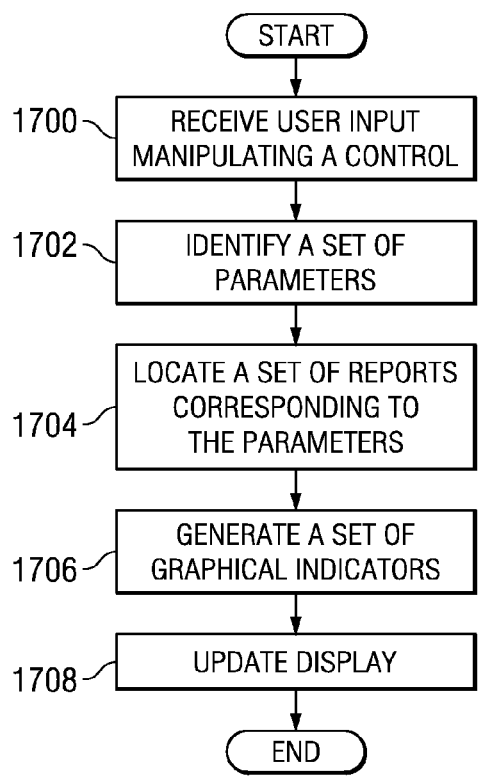
FIG. 17 is a flowchart of a process for updating a display of turbulence information in response to an operator input.

With reference now to FIG. 17, a flowchart of a process for updating a display of turbulence information in response to an operator input is presented. The process illustrated in FIG. 17 may be implemented in a software component such as, for example, turbulence display process 508 in FIG. 5. This process may be initiated in response to an operator interface, such as display 600 in FIG. 6. In particular, the operator input may be with respect to various controls and buttons presented on display 600.

The process begins by receiving an operator input manipulating a control (operation 1700). This control may be, for example, without limitation, altitude control 628, history control 630, NULL REPORT button 632, or some other suitable control.

The process then identifies a set of parameters based on the operator input (operation 1702). These parameters may be, for example, without limitation, an altitude, a range of altitudes, a time threshold, a range of times, a type of report, or some other suitable parameter. The process then locates a set of reports corresponding to the parameters (operation 1704).

Next, the process generates a set of graphical indicators (operation 1706). In these examples, the graphical indicators are icons, such as those presented in display 600.

The process then updates the display (operation 1708), with the process terminating thereafter. In updating the display, previously presented graphical indicators are removed and the new identified graphical indicators are presented on the display. Operation 1708 may include generating an additional display, such as, for example, vertical situation display 1200 within display 600, as seen in FIG. 12.

Figure 18:
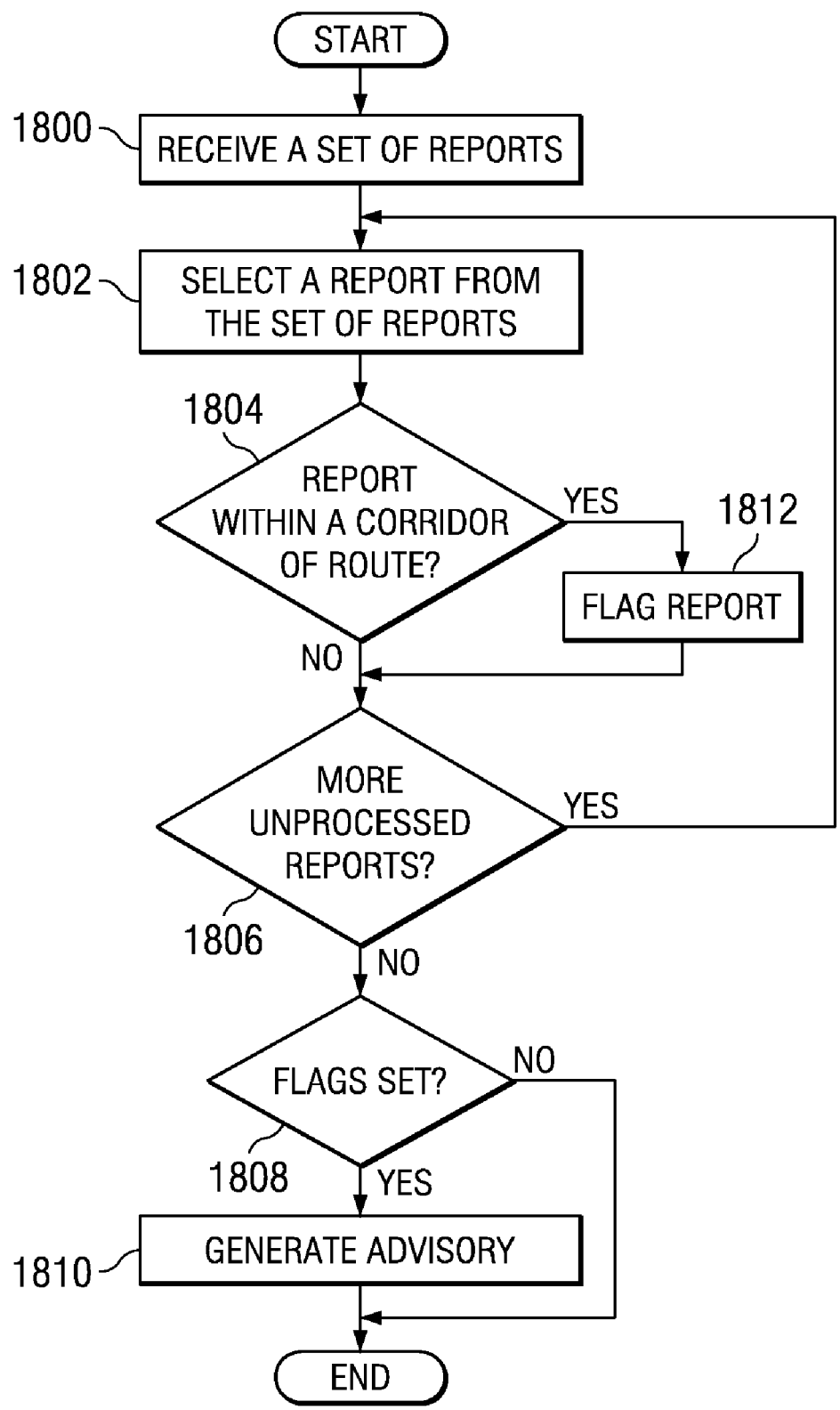
FIG. 18 is a flowchart of a process for generating advisories based on turbulence data in accordance with an advantageous embodiment.

With reference now to FIG. 18, a flowchart of a process for generating advisories based on turbulence data is depicted in accordance with an advantageous embodiment. The process illustrated in FIG. 18 may be implemented in a software component, such as, for example, turbulence display process 508 in FIG. 5.

The process begins by receiving a set of reports (operation 1800). These reports are reports containing turbulence data in these examples. The process then selects a report from the set of reports (operation 1802). A determination is made as to whether the report is within a corridor of a route (operation 1804).

In these examples, a corridor includes a distance on both or either sides of a route and a distance along the route in front of the aircraft. The corridor also may include an altitude within plus or minus a set value around the flight plan altitude. For example, a corridor may be 10 nautical miles on either side of the route, 100 nautical miles in front of a current location of the aircraft, and plus or minus 1,000 feet of the cruise altitude along the route. Of course, other parameters may be used depending on the particular implementation. The corridor is used in these examples to identify reports that are on or near the aircraft flight path.

If the report is not within the corridor of the route, a determination is made as to whether more unprocessed reports are present (operation 1806). If more unprocessed reports are present, the process returns to operation 1802. If additional unprocessed reports are not present, a determination is made as to whether any flags have been set (operation 1808). If flags have not been set, the process terminates. If a flag has been set, the process generates an advisory (operation 1810), with the process terminating thereafter.

With reference again to operation 1804, if a report is within a corridor of the route, a report is flagged (operation 1808), with the process then proceeding to operation 1806 as described above. In operation 1810, an advisory generated may be audible and/or visible to indicate that a pilot may wish to view turbulence information. The advisory also may be an input into another aircraft system. The advisory may also vary depending on the amount of turbulence and the severity of the turbulence as identified in a report. Alternatively, the presence of turbulence of a threshold intensity may send a signal to another system on the aircraft for automatic activation with or without pilot intervention.

Thus, the different advantageous embodiments provide a method, apparatus, and computer program code for presenting turbulence information. The different advantageous embodiments may identify turbulence information from turbulence data generated by a set of aircraft. This turbulence information is identified based on a request received to view turbulence information. The identified turbulence information is then displayed on a display device in the aircraft.

Further, the different advantageous embodiments also provide a capability to generate advisories automatically in response to identifying turbulence data that may affect the flight of the aircraft. In these examples, turbulence data is considered to be relevant or possibly affecting the flight of the aircraft if the turbulence data is identified within a corridor of the route of the aircraft.

Thus, the different advantageous embodiments provide a capability to view reports generated by other aircraft on a map in a manner that allows a pilot to obtain a better picture of turbulence that may affect the flight. In the different advantageous embodiments, icons representing reports are displayed on a map in the location in which the reports were generated. These reports also may be filtered based on various parameters, such as, for example, age, altitude, type of aircraft, or other suitable parameters.

Thus, the different advantageous embodiments provide a capability to present reports from many aircraft. Further, the different advantageous embodiments also allow an operator to identify where no turbulence is present.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD¬R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage for at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples, such as modems and network adapters, are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for presenting turbulence information, the method comprising:

responsive to a request received at an aircraft to view the turbulence information, identifying the turbulence information from turbulence data generated by a set of remote aircraft based on the request to form identified turbulence information;

presenting a graphical indicator for each report of a turbulence in which turbulence is present and each report of the turbulence in which no turbulence is present in the identified turbulence information to form a set of graphical indicators,
wherein the set of graphical indicators is displayed in a set of locations on a map based on where each report of the turbulence was generated;
presenting an icon on the map indicating a location of the aircraft relative to the set of locations; and
presenting a track of the aircraft along an active or modified route of the aircraft to a destination such that the set of graphical indicators are displayed along the route.

2. The method of claim 1 further comprising:
receiving a set of reports on turbulence generated by a remote aircraft in the set of remote aircraft; and
adding the set of reports to the turbulence data.

3. The method of claim 1 further comprising:
receiving the request from an operator interface displayed on a display device in the aircraft.

4. The method of claim 3, further comprising:
receiving a set of parameters in the request from the operator interface displayed on the display device, wherein the set of parameters includes at least one of an altitude, an altitude range, a time threshold, an aircraft type, a position, a level of turbulence, and a route for the aircraft.

5. The method of claim 1, wherein the presenting step comprises:
presenting the graphical indicator for each report of the turbulence in which turbulence is present and each report of the turbulence in which no turbulence is present in the identified turbulence information to form the set of graphical indicators, wherein the set of graphical indicators is displayed in the set of locations on the map based on where each report of the turbulence was generated and wherein the set of graphical indicators is displayed using color coding to graphically identify different levels of the turbulence in which turbulence is present and turbulence in which no turbulence is present.

6. The method of claim 1 further comprising:
responsive to a selection of the graphical indicator from the set of graphical indicators, presenting information from each report of the turbulence associated with the graphical indicator.

7. The method of claim 1 further comprising:
generating an advisory in response to a presence of the turbulence in the turbulence data being greater than a threshold level.

8. The method of claim 7, wherein the generating step comprises:
generating the advisory in response to the presence of the turbulence in the turbulence data being greater than the threshold level and in response to the turbulence being present in a selected location relative to a route of the aircraft.

9. A data processing system for presenting turbulence information, the data processing system comprising:
a bus;
a communications unit connected to the bus;
a storage device connected to the bus, wherein the storage device includes program code; and
a processor unit connected to the bus, wherein the processor unit executes the program code to identify the turbulence information from turbulence data generated by a set of remote aircraft based on a request to form identified turbulence information in response to the request received at an aircraft to view the turbulence information;
present a graphical indicator for each report of a turbulence in which turbulence is present and each report of the turbulence in which no turbulence is present in the identified turbulence information to form a set of graphical indicators,
wherein the set of graphical indicators is displayed in a set of locations on a map based on where each report of the turbulence was generated;
present an icon on the map indicating a location of the aircraft relative to the set of locations; and
present a track of the aircraft along an active or modified route of the aircraft to a destination such that the set of graphical indicators are displayed along the route.

10. The data processing system of claim 9, wherein the data processing system further executes the program code to receive a set of reports on turbulence generated by a remote aircraft in the set of remote aircraft; and add the set of reports to the turbulence data.

11. The data processing system of claim 9, wherein the data processing system further executes the program code to receive the request from an operator interface displayed on a display device in the aircraft.

12. The data processing system of claim 11, wherein the data processing system further executes the program code to receive a set of parameters in the request from the operator interface displayed on the display device, wherein the set of parameters includes at least one of an altitude, an altitude range, a time threshold, an aircraft type, a position, a level of turbulence, and a route for the aircraft.

13. A computer program product for presenting turbulence information, the computer program product comprising:
a non-transitory computer recordable storage medium;
program code, stored on the computer recordable storage medium, for identifying the turbulence information from turbulence data generated by a set of remote aircraft based on a request to form identified turbulence information in response to the request received at an aircraft to view the turbulence information;
program code, stored on the computer recordable storage medium, for presenting a graphical indicator for each report of a turbulence in which turbulence is present and each report of the turbulence in which no turbulence is present in the identified turbulence information to form a set of graphical indicators,
wherein the set of graphical indicators is displayed in a set of locations on a map based on where each report of the turbulence was generated;
presenting an icon on the map indicating a location of the aircraft relative to the set of locations; and
presenting a track of the aircraft along an active or modified route of the aircraft to a destination such that the set of graphical indicators are displayed along the route.

14. The computer program product of claim 13 further comprising:
program code, stored on the computer recordable storage medium, for receiving a set of reports on turbulence generated by a remote aircraft in the set of remote aircraft; and
program code, stored on the computer recordable storage medium, for adding the set of reports to the turbulence data.

15. The computer program product of claim 13 further comprising:
program code, stored on the computer recordable storage medium, for receiving the request from an operator interface displayed on a display device in the aircraft.

16. The computer program product of claim 15, further comprising:

program code, stored on the computer recordable storage medium, for receiving a set of parameters in the request from the operator interface displayed on the display device, wherein the set of parameters includes at least one of an altitude, an altitude range, a time threshold, an aircraft type, a position, a level of turbulence, and a route for the aircraft.

17. The method of claim 1, wherein the graphical indicator for each report of turbulence in which turbulence is present and each report of turbulence in which no turbulence is present further comprises a separate graphical indicator for at least one of no turbulence, light turbulence, moderate turbulence, or extreme turbulence.

18. The method of claim 1, wherein the graphical indicator for each report of turbulence in which turbulence is present and each report of turbulence in which no turbulence is present further comprises a numerical value indicating intensity of the turbulence.

19. The data processing system of claim 9, wherein the graphical indicator for each report of turbulence in which turbulence is present and each report of turbulence in which no turbulence is present further comprises a separate graphical indicator for at least one of no turbulence, light turbulence, moderate turbulence, or extreme turbulence.

20. The data processing system of claim 9, wherein the graphical indicator for each report of turbulence in which turbulence is present and each report of turbulence in which no turbulence is present further comprises a numerical value indicating intensity of the turbulence.

21. The computer program product of claim 13, wherein the graphical indicator for each report of turbulence in which turbulence is present and each report of turbulence in which no turbulence is present further comprises a separate graphical indicator for at least one of no turbulence, light turbulence, moderate turbulence, or extreme turbulence.

22. The computer program product of claim 13, wherein the graphical indicator for each report of turbulence in which turbulence is present and each report of turbulence in which no turbulence is present further comprises a numerical value indicating intensity of the turbulence.

23. The method of claim 1 further comprising the step of presenting a vertical situation display that includes the set of graphical indicators along the route for a selected altitude range.

24. The method of claim 1 further comprising the step of, responsive to a selection, displaying only the graphical indicators that include turbulence that meets a specified threshold.

25. The method of claim 1 further comprising the step of, responsive to a history selection, displaying only the graphical indicators that include turbulence information within a specified time limit.

* * * * *